United States Patent
Reddy et al.

(10) Patent No.: US 10,007,683 B1
(45) Date of Patent: Jun. 26, 2018

(54) CONDITIONAL CREATION OF CHILD NODES BASED ON ANCESTOR NODE METADATA RUNTIME VALUES

(71) Applicant: EMC Corporation, Hopkinton, MA (US)

(72) Inventors: Satyapal P. Reddy, Fremont, CA (US); Julian Hjortshoj, San Francisco, CA (US); Ravikumar Meenakshisundaram, Pleasanton, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 188 days.

(21) Appl. No.: 15/066,235

(22) Filed: Mar. 10, 2016

(51) Int. Cl.
  *G06F 7/04*  (2006.01)
  *G06F 17/30*  (2006.01)
  *G06F 21/60*  (2013.01)

(52) U.S. Cl.
  CPC .. *G06F 17/30294* (2013.01); *G06F 17/30525* (2013.01); *G06F 21/604* (2013.01)

(58) Field of Classification Search
  CPC .... H04L 63/10; H04L 63/126; H04L 63/0884
  USPC .......................................................... 726/17
  See application file for complete search history.

(56) References Cited

U.S. PATENT DOCUMENTS

2014/0310034 A1* 10/2014 Li .................... G06Q 10/06393
  705/7.11
2017/0017503 A1* 1/2017 Levy .................... G06F 9/4448

* cited by examiner

*Primary Examiner* — Mohammad W Reza
(74) *Attorney, Agent, or Firm* — Dergosits & Noah LLP; Todd A. Noah

(57) ABSTRACT

Conditional creation of child nodes based on ancestor node metadata runtime values are described. A system receives, from an end user device, a runtime request to create an instance of a child node in a case model. The system identifies an instance of an ancestor node associated with the instance of the child node. The system identifies a runtime value of metadata associated with the instance of the ancestor node and corresponding to the instance of the child node. The system determines whether the runtime value of the metadata satisfies a condition. The system creates the instance of the child node in response to a determination that the runtime value of the metadata satisfies the condition. The system enables the end user device to access the created child node.

20 Claims, 9 Drawing Sheets

```
1   casemodel
2     CaseModel -> DataModel
3       rootnode : CaseNode
4   datamodel
5     CaseNode -> DataModel
6       lifecycle : Lifecycle
7       minOccurs : EInt
8       maxOccurs : EInt
9       caseroles : CaseRole
10      dataPermissions : CasePermisson
11      rolePermissions : CasePermisson
12      phasePermissions : PhasePermission
13      dataServiceContracts : DataServiceContract
14    CaseContainerNode -> CaseNode
15    CaseLeafNode -> CaseNode
16  perm
17    C_____ > Identity
18      name : EString
19      label : EString
20    DescendentCaseRoleAlias -> CaseRole
21    Permissions
22      – CREATE = 0
23      – READ = 1
24      – UPDATE = 2
25      – DELETE = 3
26    CasePermisson
27      roles : Identity
28      phases : Phase
29      permissions : Permissions
30    PhasePermission
```

CONDITIONAL CREATION OF CHILD NODES BASED ON ANCESTOR NODE METADATA RUNTIME VALUES

BACKGROUND

The exponential growth of available data, coupled with an increasing complexity of customer and regulatory data requirements, has presented challenges to information management organizations. These challenges have led to the application of data models and case management systems to organize data and effectively communicate relevant business metrics. Traditionally used in social services, healthcare, banking, insurance, and legal environments, case management systems are rapidly expanding into many other industries as organizations recognize that case management systems can be used to make data easily accessible, up-to-date, quickly tracked, and more manageable in the context of business processes.

BRIEF DESCRIPTION OF THE DRAWINGS

FIG. 8 is one example of software instructions that can implement the tree structure of FIG. 3, FIG. 4, FIG. 5, FIG. 6, or FIG. 7, under an embodiment.

DETAILED DESCRIPTION

Embodiments herein provide conditional creation of child nodes based on ancestor node metadata runtime values. A system receives, from an end user device, a runtime request to create an instance of a child node in a case model. The system identifies an instance of an ancestor node associated with the instance of the child node. The system identifies a runtime value of metadata associated with the instance of the ancestor node and corresponding to the instance of the child node. The system determines whether the runtime value of the metadata satisfies a condition. The system creates the instance of the child node in response to a determination that the runtime value of the metadata satisfies the condition. The system enables the end user device to access the created child node.

For example, a loan administrator's device requests a case management system to create an instance of a child node for documents for an instance of a parent node for personal income verification associated with a home loan case. The case management system accesses a "CreateOnConditionExpression: Parent.salaried=true" expression in the child node for documents in the hierarchical case model, which identifies the instance of the parent node for personal income verification and its Boolean metadata "salaried." The case management system identifies the runtime value as "true" for the personal income verification parent node's Boolean metadata "salaried." The case management system determines whether the "true" runtime value of the Boolean metadata "salaried" satisfies the expression "CreateOnConditionExpression: Parent.salaried=true" in the child node for documents in the hierarchical case model. The case management system creates the child node for documents as a specific child node for salaried employment documents because the runtime value of "true" for the Boolean metadata "salaried" satisfies the condition of the expression in the child node for documents in the hierarchical case model. The case management system enables the loan administrator's device to access the instance of the hierarchical case model for the home loan, which includes the child node for salaried employment documents. The case management system bases conditional creation of child nodes on ancestor node metadata runtime values, without the need for an application developer to create any custom code for any hierarchical case models.

Figure 1:
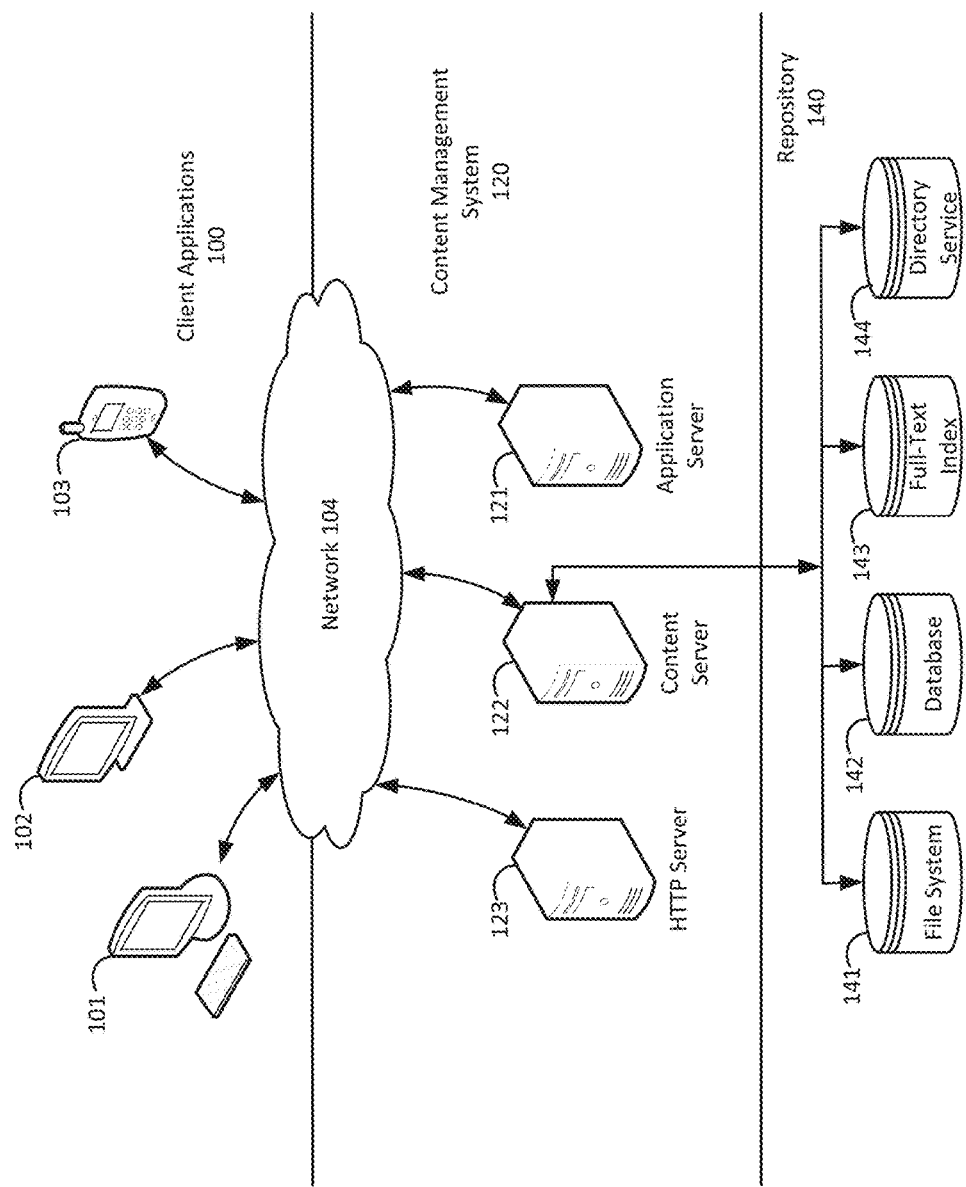
FIG. 1 illustrates a block diagram of an example system for conditional creation of child nodes based on ancestor node metadata runtime values, under an embodiment.

Prior to describing the subject matter in detail, an exemplary hardware system in which the subject matter may be implemented is described. Those of ordinary skill in the art will appreciate that the elements illustrated in FIG. 1 may vary depending on the system implementation. FIG. 1 illustrates one embodiment of a system for providing an enterprise-level managed content service. Client applications 100 access a content management system 120, which operates and manages a repository system 140.

The use of the client applications 100 originates from client devices, such as client devices 101, 102, 103, which communicate through a network 104 with an application server 121 in order to use one or more applications hosted in part or entirely on the application server 121. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Each of the client devices 101-103 may be any type of processor-based digital device, such as desktop, laptop computer, tablet, smartphone, or other smart hand-held device.

The application server 121 hosts one or more applications running on a content management platform that provide access to the repository 140 for clients hosted on a content server 122, which is also accessible to the client devices 101-103 via the network 104. An HTTP server 123 is also coupled to the network 104 to provide an administrative terminal for system operators to perform system maintenance, logging, access control, etc. The client devices 101-103 and the servers 121-123 may each be substantially similar to the system 900 depicted in FIG. 9 and described below.

The repository 140 is provided for use by the client applications 100, through the content server 122, which is accessible to the client devices 101-103 through the network 104. The repository 140 may include a file store 141 for storing content items, a relational database 142 for storing attributes/metadata associated with the content items, a full-text index store 143 for the content items, and directory services 144.

A software platform runs on each of the various components, such as the Documentum® Platform software and related Enterprise Content Management software, provided by EMC® Corporation, Hopkington, Mass. The Documentum® Platform provides capabilities for managing enterprise content and is the foundation for related content management and case management product offering.

Figure 2:
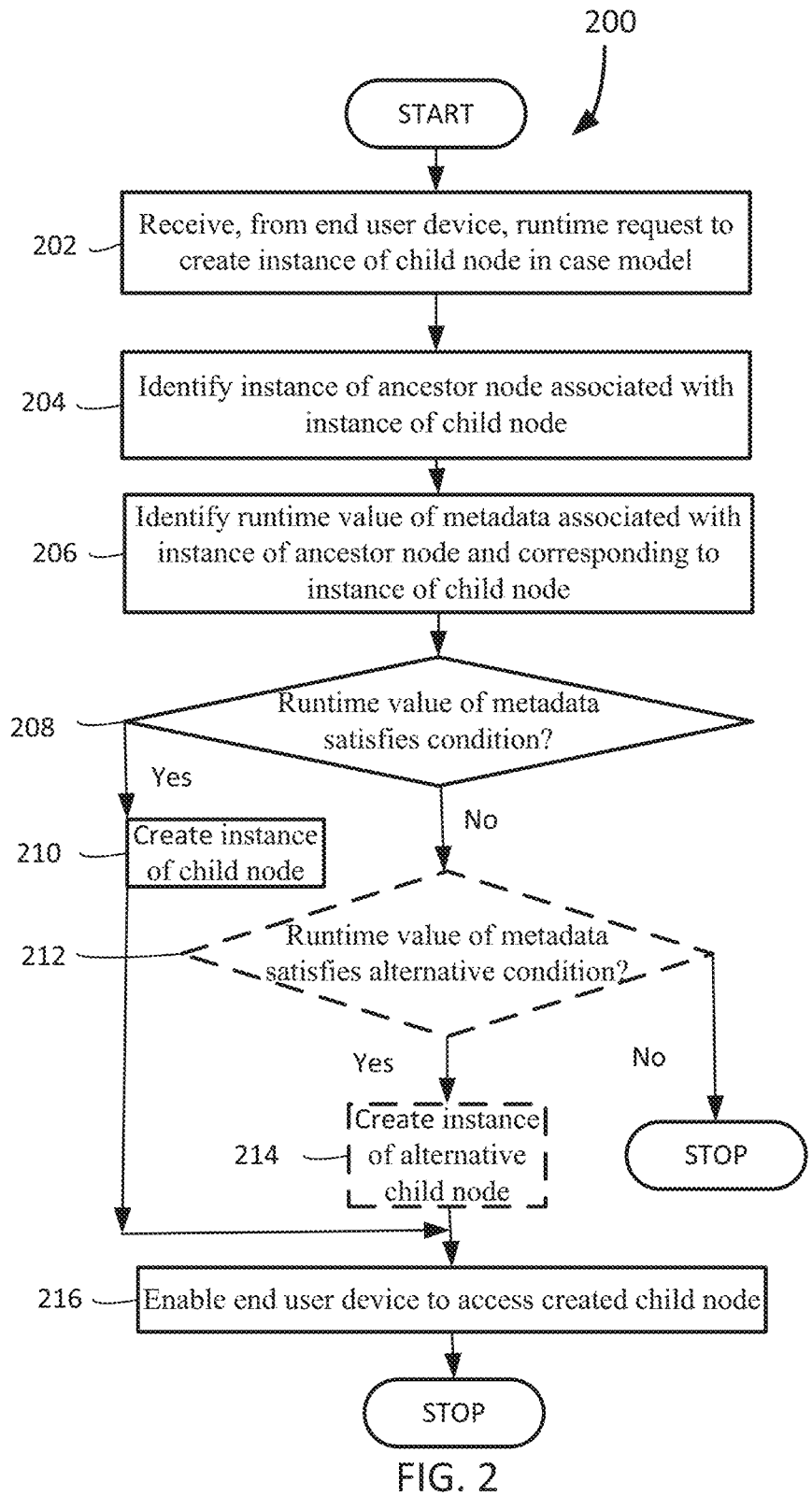
FIG. 2 is an example flow chart illustrating a process for conditional creation of child nodes based on ancestor node metadata runtime values, under an embodiment.

FIG. 2 is a flowchart that illustrates a method for conditional creation of child nodes based on ancestor node metadata runtime values, under an embodiment. Flowchart 200 illustrates method acts illustrated as flowchart blocks for certain steps involved in and/or between the client devices 101, 102, or 103 and/or the servers 121, 122, or 123 of FIG. 1.

Figure 3:
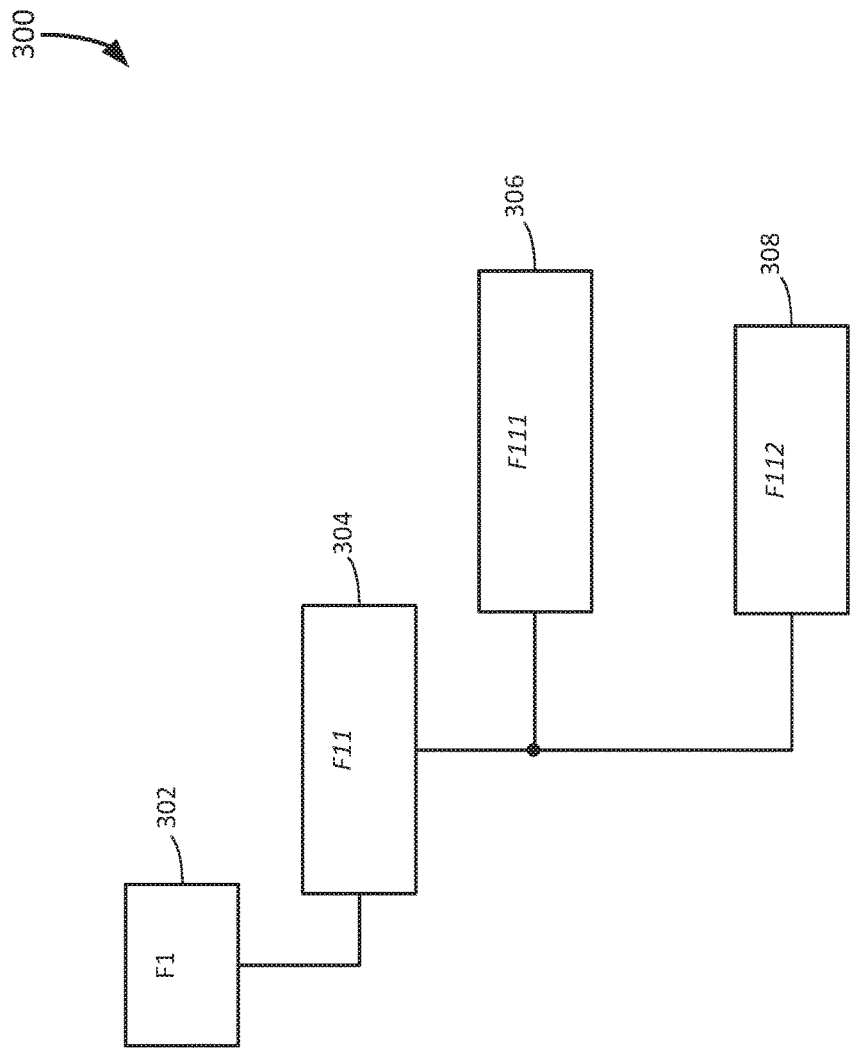
FIG. 3 is a block diagram illustrating an example case model implemented as a hierarchical tree structure, under an embodiment.

A runtime request to create an instance of a child node in a case model is received from an end user device, block 202. For example, a loan administrator's device requests a case management system to create an instance of a child node F111 for documents for an instance of a parent node F11 for personal income verification associated with a home loan case. The parent node F11 for personal income verification may have its own parent node F1 for a "Loan 123." An example of a hierarchical case model 300 which includes the nodes F1, F11, and F111, as well as the potential child node F112 are depicted in FIG. 3 and described below in reference to FIG. 3.

Having received the runtime request to create the instance of the child node, an instance of an ancestor node associated with the instance of the child node is identified, block 204. For example, the case management system accesses a "CreateOnConditionExpression: Parent.salaried==true" expression in the child node F111 for documents in the hierarchical case model, which identifies the instance of the parent node F11 for personal income verification and its Boolean metadata "salaried." Although this example describes an expression in a child node identifying an instance of the parent node for the child node, an expression in a child node may identify an instance of any type of ancestor node for the child node, such as an instance of a grandparent node for the child node.

After identifying the instance of the ancestor node, a runtime value of metadata associated with the instance of the ancestor node and corresponding to the instance of the child node is identified, block 206. For example, the case management system identifies the runtime value as "true" for the personal income verification parent node's Boolean metadata "salaried," a runtime value which would not have be known by any developer at development time for the hierarchical case model Although this example describes an expression in a child node identifying Boolean metadata, an expression in a child node may identify any type of metadata, such as integers, decimal-based numbers, cases phases, case roles, and sets of access permissions.

Having identified the runtime value of the metadata, a determination is made whether the runtime value of the metadata satisfies a condition, block 208. For example, the case management system determines whether the "true" runtime value of the Boolean metadata "salaried" satisfies the expression "CreateOnConditionExpression: Parent.salaried==true" in the child node F111 for documents in the hierarchical case model. If the runtime value of the metadata satisfies the condition, the flowchart 200 continues to block 210. If the runtime value of the metadata does not satisfy the condition, the flowchart 200 proceeds to block 212.

If the runtime value of the metadata satisfies the condition, the instance of the child node is created, block 210. For example, the case management system creates the child node F111 for documents as a specific child node F111 for salaried employment documents because the runtime value of "true" for the Boolean metadata "salaried" satisfies the condition of the expression in the child node F111 for documents in the hierarchical case model. Then the flowchart 200 proceeds to block 216.

The case management system may conditionally create child nodes based on other types of runtime ancestor node metadata values, such as metadata values for an integer, a decimal-based number, a case phase, a case role, and/or a set of case access permissions. For example, the case management system may receive a request to create another child node for home details, access the child node's expression which identifies the parent node's metadata "phase," identify the runtime value for the metadata "phase" as "loan initiation," and conditionally create the child node for home details as a child node for an alternative home for the loan applicant's loan. Continuing this example, the case management system may receive a request to create another child node for home details, access the child node's expression which identifies the parent node's metadata "phase," identify the runtime value for the metadata "phase" as "offer rejected," and conditionally create the child node for home details as a child node for the primary home for the loan applicant's loan.

In another example, the case management system may access a child node's expression which identifies a parent node's metadata "underwriter_role," identify the runtime value for "underwriter_role" as "senior," and conditionally create a child node for large loan documents because senior underwriters are only assigned large loans. Continuing this example, the case management system may access a child node's expression which identifies a parent node's metadata "underwriter_role," identify the runtime value for "underwriter_role" as "junior," and conditionally create a child node for small loan documents because junior underwriters are only assigned small loans.

In yet another example, the case management system may receive a runtime request to create a child node for supplemental documents, access the child node's expression which identifies a parent node's metadata "loan_applicant_access_permissions," and identify the runtime value for "loan_applicant_access_permissions" as "create, read, update, and delete." The case management system may respond to the runtime metadata value of "create, read, update, and delete" by conditionally creating a child node for loan applicant documents because the parent node's set of access permissions for the loan applicant indicate that the supplemental documents are the loan applicant's documents. Continuing this example, the case management system may receive a runtime request to create a child node for supplemental documents, access the child node's expression which identifies a parent node's metadata "loan_applicant_access_permissions," and identify the runtime value for "loan_applicant_access_permissions" as "no access." The case management system may respond to this runtime metadata value of "no access" by conditionally creating a child node for loan administrator documents because the parent node's set of access permissions for the loan applicant indicate that the supplemental documents are not the loan applicant's documents. The case management system may assign any set of permissions to a case role from a group of permissions that includes a create permission, a read permission, an update/edit permission, a delete permission, and a no access permission.

If the runtime value of the metadata does not satisfy the condition, a determination is optionally made whether the runtime value of the metadata satisfies an alternative condition, block 212. For example, the case management system determines whether the "false" runtime value of the Boolean metadata "salaried" satisfies the expression "CreateOnConditionExpression: Parent.salaried=false" in the child node F112 for documents in the hierarchical case model. If the runtime value of the metadata satisfies the alternative condition, the flowchart 200 continues to block 214. If the runtime value of the metadata does not satisfy the alternative condition, the flowchart 200 terminates.

If the runtime value of the metadata satisfies the alternative condition, an instance of an alternative child node is optionally created, block 214. For example, the case management system creates the child node F112 for documents as a specific child node F112 for self-employed documents because the runtime value of "false" for the Boolean metadata "salaried" satisfies the condition of the expression in the child node F112 for documents in the hierarchical case model.

Although these examples describe the case management system determining whether the runtime value of an ancestor node's metadata satisfy either of two Boolean conditions, the determination may be made based on satisfying any number of conditions. For example, the case management system accesses a child node's expression which identifies a parent node's metadata "loan_amount," identifies the runtime value for "loan_amount" as corresponding to a large loan (more than $1,000,000), an intermediate loan (from $500,000 to $1,000,000), or a small loan (less than $500,000) based on corresponding thresholds in three different child node expressions. Then the case management system conditionally creates a child node for a large loan and assigns a role for a senior loan underwriter and a set of access permissions for the senior loan writer, conditionally creates a child node for an intermediate loan and assigns a role for a mid-level loan underwriter and a set of access permissions for the mid-level loan writer, or conditionally creates a child node for a small loan and assigns a role for a junior loan underwriter and a set of access permissions for the junior loan writer, based on which child node's expression is satisfied.

After conditionally creating a child node, the end user device is enabled to access the created child node, block 216. For example, the case management system enables the loan administrator's device to access the instance of the hierarchical case model for the "Loan 123," which includes the child node F111 for salaried employment documents. Alternatively, the hierarchical case model for the "Loan 123" may include the child node F112 for self-employed documents.

Although FIG. 2 depicts the blocks 202-216 occurring in a specific order, the blocks 202-216 may occur in another order. In other implementations, each of the blocks 202-216 may also be executed in combination with other blocks and/or some blocks may be divided into a different set of blocks. The case management system conditionally creates child nodes based on runtime ancestor node metadata values, without the need for an application developer to create any custom code for any hierarchical case models. The case management system may create multiple instances of any hierarchical case model, with each instance already containing the complex hierarchical case model metadata expressions.

Referring to FIG. 3, one example of a hierarchical case model 300 is illustrated. The F1 node (block 302) represents the container, or engagement space, of the case model as a whole. The F11 node (block 304) represents a first project container for a specific application or case that utilizes the case model that includes the F1 node. For example, the F11 node represents personal income verification, and may be conditionally created based on the runtime metadata values of the parent F1 node, which represents a home loan. There may be other project containers for other applications on the same level as the F11 node, utilizing the case model that includes the F1 node. The F111 node (block 306), which represents salaried employment documents, and the F112 node (block 308), which represents self-employed documents, are alternative child nodes, one of which may be conditionally created based on runtime metadata values of the F11 node (block 302). Furthermore, either of the F111 node and the F112 node may be conditionally created based on the runtime metadata values of the (relative to the nodes F111 and F112) grandparent F1 node.

Figure 4:
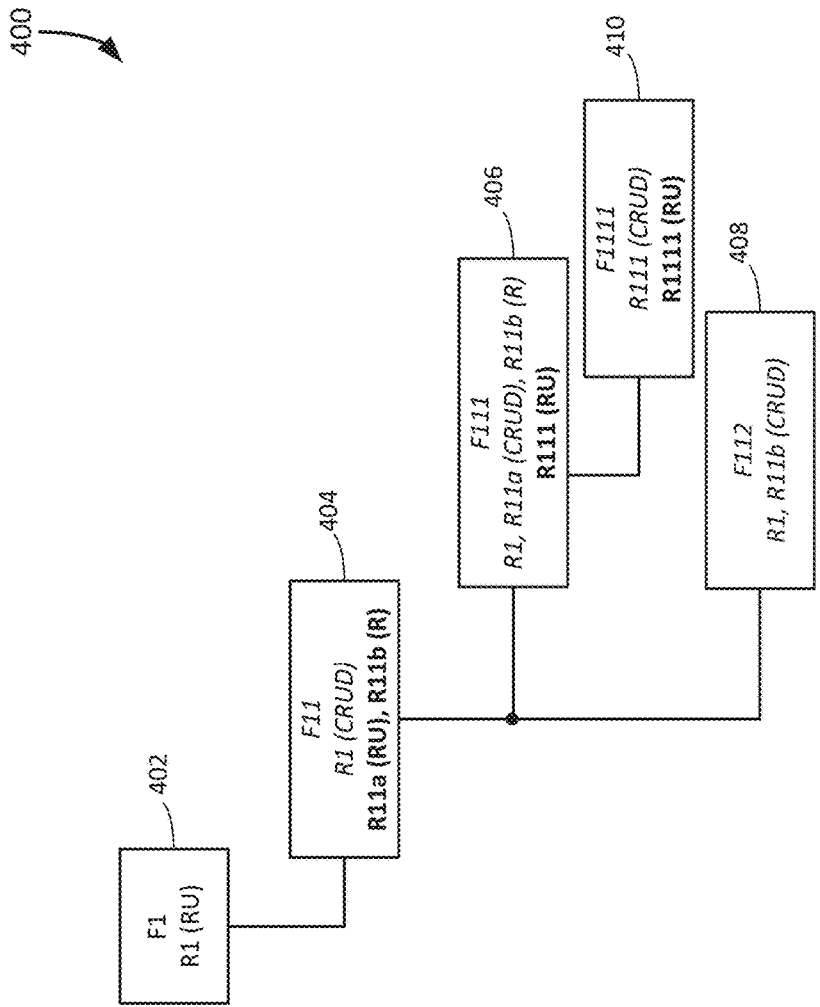
FIG. 4 is a block diagram illustrating another example case model implemented as a hierarchical tree structure, under an embodiment.

Referring to FIG. 4, one example of a hierarchical case model 400 is illustrated. The F1 node (block 402) represents the container, or engagement space, of the case model as a whole, and a corresponding role R1 is assigned permissions to read (R) and update/edit (U) the F1 node.

The F11 node (block 404) represents a first project container for a specific application or case that utilizes the case model that includes the F1 node. For example, the F11 node represents the case of a home loan. For hierarchical case models, the roles and permissions corresponding to the F11 node could automatically inherit the roles and permissions corresponding to the F1 node. In this case model, since the F11 node represents the application level, all permissions are available to be granted to the user role R1 at this level (block 404), namely create, read, update/edit and delete (CRUD). There may be other project containers for other applications on the same level as the F11 node, utilizing the case model that includes the F1 node.

In addition, new permissions can be defined and assigned to selected roles and/or users. For example, as noted above, the F11 node represents a first object corresponding to the case model that includes the F1 node, and a first group of users, such as U1 and U2, can be assigned as members belonging to the R11a case role, and having the permissions for read (R) and update (U). (block 404) Likewise, a second group of users, such as U3 and U4, can be assigned as members belonging to the R11b case role, and having the permissions for read (R) only (block 404).

The F111 node (block 406) and the F112 node (block 408) are defined sub-nodes, or children, of the main F11 node (block 402), or parent node. The F111 node and the F112 node are therefore considered children nodes which may include roles and permissions that correspond to the parent node F11 node. That is, the R1 case role could inherit all of the CRUD permissions for both of the F111 node and the F112 node. The first group of users R11a (including users U1 and U2) also has all CRUD permissions for the F111 node, and a sub-group of users R111 is granted read (R) and update (U) permissions only for the F111 node (block 406). The second group of users R11b is granted read (R) permissions only for the F111 node (block 406). The second group of users R11b (including the users U3 and U4) could also inherit all of the CRUD permissions for the F112 node, while the first groups of users R11a is granted no access permissions for the F112 node (block 408). Similarly, the roles and the permissions corresponding to the F111 node are listed in block 310.

Figure 5:
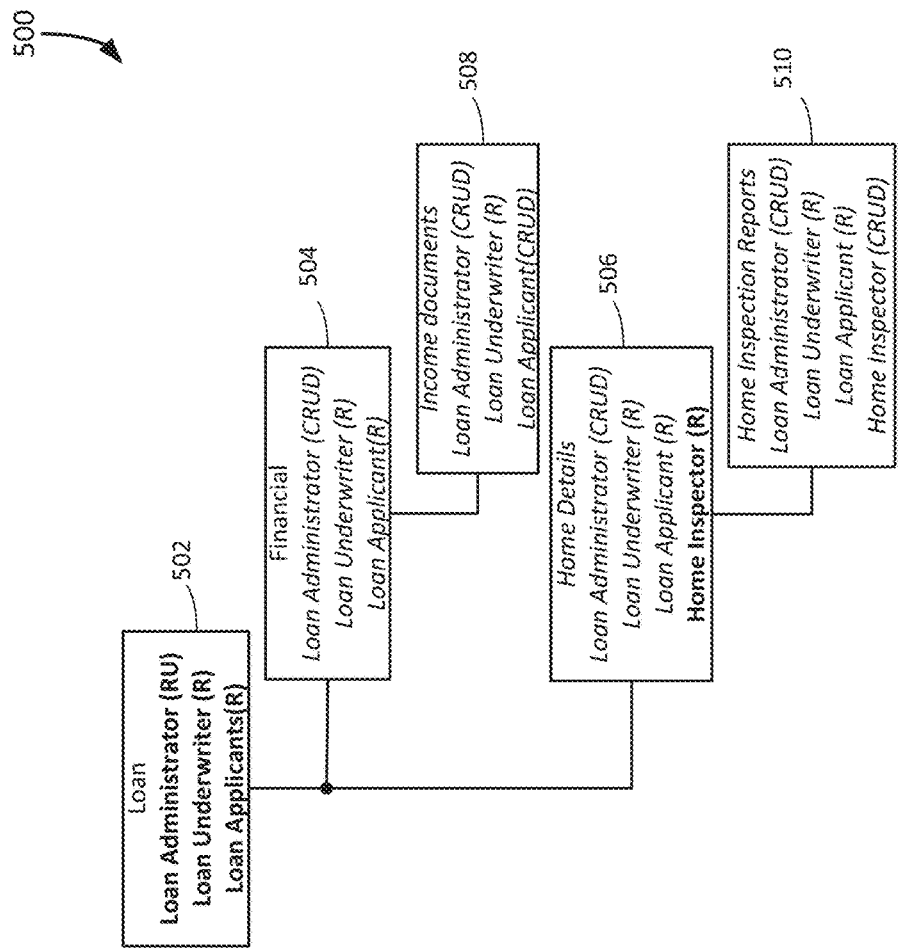
FIG. 5 is a block diagram illustrating yet another example case model implemented as a hierarchical tree structure, under an embodiment.

FIG. 5 illustrates a more concrete example model 500 of the hierarchical case model 400 for the case of a home loan. A loan 502 node represents the container of the case model as a whole, including loan administrator, loan underwriter, and loan applicant roles defined for the case model and assigned global permissions. For example, the loan administrator role is assigned permissions to read (R) and update/edit (U) for the loan 502 node; the loan underwriter role is assigned permission to read (R) only for the loan 502 node; and the loan applicant role is assigned permission to read (R) only for the loan 502 node.

A financial 504 node is defined to store financial documents for the loan process, such as income documents in an income documents 508 node, and a home details 506 node is defined to store documents related to home details, such as in home inspection reports 510 node. The roles and permissions corresponding to the financial 504 node could include inherited roles and permissions from the loan 502 node. For example, the loan administrator role is granted all permissions to create (C), read (R), update/edit (U), and delete (D) the financial 504 node. The roles and permissions corresponding to the income documents 508 node could include inherited roles and permissions from the financial 404 node. Further, the loan applicant role is granted all permissions to create (C), read (R), update/edit (U), and delete (D) the income documents 408 node.

The roles and permissions corresponding to the home details 406 node could include inherited roles and permissions from the loan 502 node. For example, the loan administrator role is granted all permissions to create (C), read (R), update/edit (U), and delete (D) for the home details 506 node. In addition, a new role is defined at this level, namely, the home inspector role, and is assigned permission to read (R) only for the home details 506 node. The roles and permissions that correspond to the home inspection reports 510 node could include inherited roles and permissions from the home details 506 node. In this scenario, the home inspector role is also assigned all of the permissions to create (C), read (R), update/edit (U), and delete (D) the home inspection reports 510 node.

Figure 6:
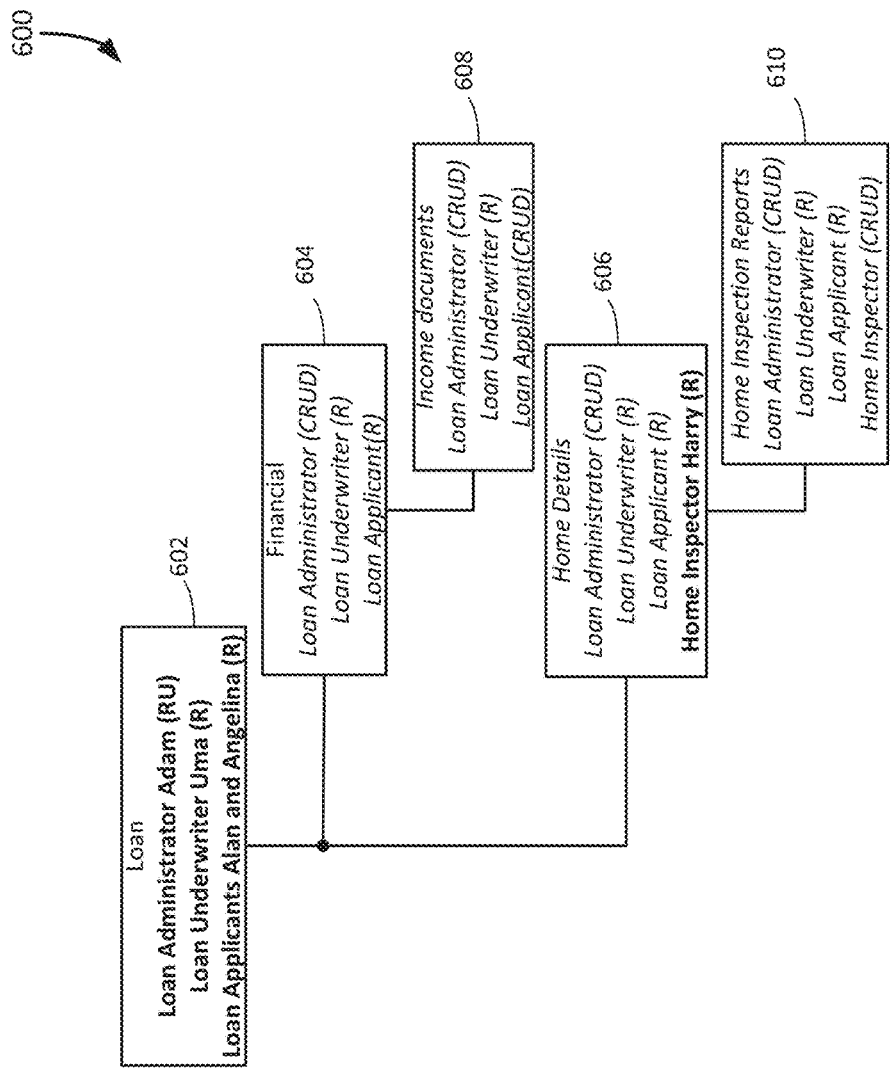
FIG. 6 is a block diagram illustrating a further example case model implemented as a hierarchical tree structure, under an embodiment.

FIG. 6 illustrates an example instance 600 of the hierarchical case model 500 for the case of a home loan. The example instance 600 could be for "Loan 123," in which specific individuals are assigned case roles at runtime. For example, Adam is assigned the loan administrator case role, Uma is assigned the loan underwriter case role, both Alan and Angelia are assigned the loan applicants case role, and Harry is assigned the home inspector case role for the "Loan 123" example instance 600 of the hierarchical case model 500.

Figure 7:
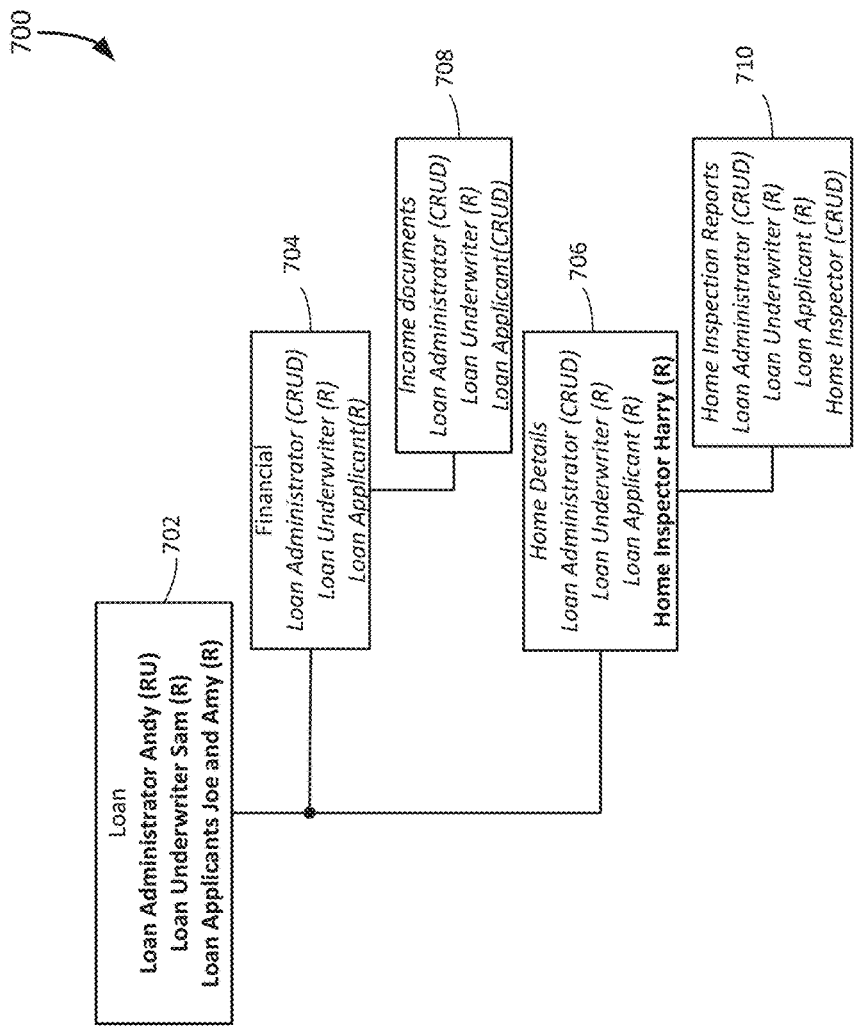
FIG. 7 is a block diagram illustrating an additional example case model implemented as a hierarchical tree structure, under an embodiment.

FIG. 7 illustrates another example instance 700 of the hierarchical case model 500 for the case of a home loan. The example instance 700 could be for "Loan 456," in which the individuals who are assigned the case roles could be entirely different from the individuals who assume the case roles for the "Loan 123." For example, Andy is assigned the loan administrator case role, Sam is assigned the loan underwriter case role, both Joe and Amy are assigned the loan applicants case role, and Harry is assigned the home inspector case role of the "Loan 456" instance of the hierarchical case model 400. For these examples, other than Harry, who coincidentally assumes the home inspector case role for both instances 600 and 700, the individuals who are assigned the case roles for the "Loan 123" would have none of the access permissions for the "Loan 456," and the individuals who are assigned the case roles for the "Loan 456" would have none of the access permissions for the "Loan 123."

Each case model instance may go through several phases, such as loan initiation, review, underwriting, and closed. The case management system may implement various actions based on phase changes, such as changing all access permissions to read only when a case model instance enters into the closed phase. The case management system may implement event triggers based on phase changes or based on either any case model instance or case node being created, thereby triggering a stateful/stateless process or an action such as sending an email.

A meta-model to describe the hierarchical case model access roles and permissions described above may be expressed in any modeling language. For example, FIG. 8 illustrates an example designed using the Eclipse Modeling Framework. Lines 1-3 indicate that the case management system creates a container, or engagement space, for a "case model" that is modeled with a "data model" with specific instances of "case nodes." Lines 4-15 define the data model in terms of a lifecycle, case roles, permissions, and other useful characteristics, such as anchor points for additional disclosure re phases, events and placeholders of other applications. Lines 16-30 further define the permissions.

Figure 9:
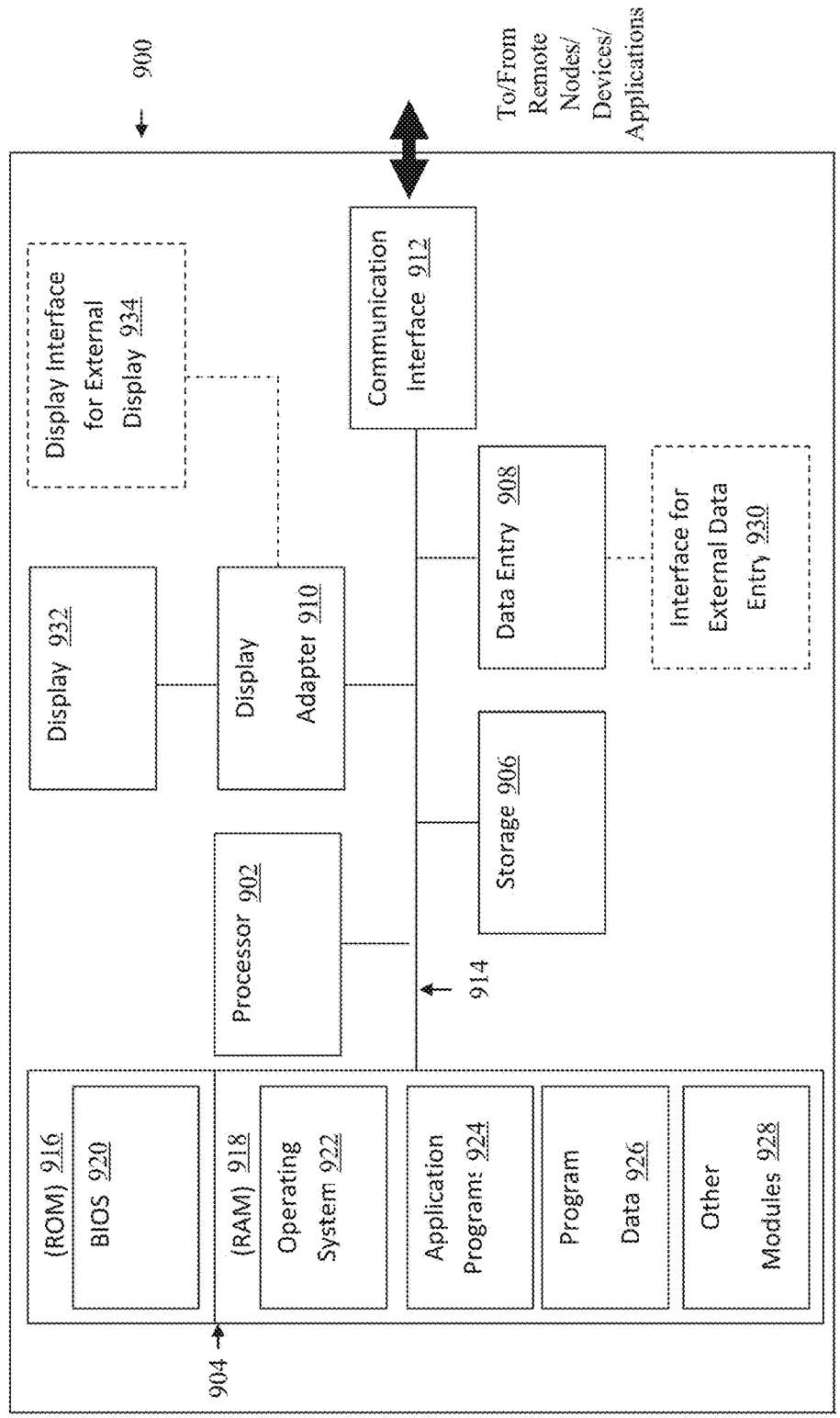
FIG. 9 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 9 may vary depending on the system implementation. With reference to FIG. 9, an exemplary system for implementing the subject matter disclosed herein includes a hardware device 900, including a processing unit 902, memory 904, storage 906, a data entry module 908, a display adapter 910, a communication interface 912, and a bus 914 that couples the elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in the memory 904 and/or the storage 906 and/or received via the data entry module 908.

The memory 904 may include read only memory (ROM) 916 and random access memory (RAM) 918. The memory 904 may be configured to store program instructions and data during operation of the hardware device 900. In various embodiments, the memory 904 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 904 may also include nonvolatile memory technologies such as nonvolatile flash RAM (NVRAM) or ROM. In some embodiments, it is contemplated that the memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in the ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 906, the ROM 916 or the RAM 918, including an operating system 922, one or more applications programs 924, program data 926, and other program modules 928. A user may enter commands and information into the hardware device 900 through the data entry module 908. The data entry module 908 may include mechanisms such as a keyboard, a touch screen, a pointing device, etc. Other external input devices (not shown) are connected to the hardware device 900 via an external data entry interface 930. By way of example and not limitation, external input devices may include a microphone, joystick, game pad, satellite dish, scanner, or the like. In some embodiments, external input devices may include video or audio input devices such as a video camera, a still camera, etc. The data entry module 908 may be configured to receive input from one or more users of the hardware device 900 and to deliver such input to the processing unit 902 and/or the memory 904 via the bus 914.

A display 932 is also connected to the bus 914 via the display adapter 910. The display 932 may be configured to display output of the hardware device 900 to one or more users. In some embodiments, a given device such as a touch screen, for example, may function as both the data entry module 908 and the display 932. External display devices may also be connected to the bus 914 via an external display interface 934. Other peripheral output devices, not shown, such as speakers and printers, may be connected to the hardware device 900.

The hardware device 900 may operate in a networked environment using logical connections to one or more remote nodes (not shown) via the communication interface 912. The remote node may be another computer, a server, a router, a peer device or other common network node, and typically includes many or all of the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 912 may include logic configured to support direct memory access (DMA) transfers between the memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

It should be understood that the arrangement of the hardware device 900 illustrated in FIG. 9 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 900.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for conditional creation of child nodes based on ancestor node metadata runtime values, the system comprising:
    a processor-based application executable on a computer system, the computer system having one or more processors and a non-transitory computer-readable medium storing a plurality of instructions, which when executed, cause the one or more processors to:
    receive, from an end user device, a runtime request to create an instance of a child node in a case model;
    identify an instance of an ancestor node associated with the instance of the child node;
    identify a runtime value of metadata associated with the instance of the ancestor node and corresponding to the instance of the child node;
    determine whether the runtime value of the metadata satisfies a condition;
    create the instance of the child node in response to a determination that the runtime value of the metadata satisfies the condition; and
    enable the end user device to access the created child node.

2. The system of claim 1, wherein the instance of the ancestor node comprises one of an instance of a parent node for the instance of the child node and the instance of the ancestor node of the instance of the parent node for the instance of the child node.

3. The system of claim 1, wherein the processor-based application is further configured to: determine whether the runtime value of the metadata satisfies an alternative condition; and create an instance of an alternative child node in response to a determination that the runtime value of the metadata satisfies the alternative condition.

4. The system of claim 1, wherein the runtime value of the metadata associated with the instance of the ancestor node comprises a corresponding case role.

5. The system of claim 1, wherein the runtime value of the metadata associated with the instance of the ancestor node comprises a corresponding case phase.

6. The system of claim 1, wherein the runtime value of the metadata associated with the instance of the ancestor node comprises a corresponding set of access permissions.

7. The system of claim 6, wherein the corresponding set of permissions is created from a group comprising create permission, read permission, update permission, delete permission, and no access permission.

8. A computer-implemented method for conditional creation of child nodes based on ancestor node metadata runtime values, the method comprising:
    receiving, from an end user device, a runtime request to create an instance of a child node in a case model;
    identifying an instance of an ancestor node associated with the instance of the child node;
    identifying a runtime value of metadata associated with the instance of the ancestor node and corresponding to the instance of the child node;
    determining whether the runtime value of the metadata satisfies a condition;
    creating the instance of the child node in response to a determination that the runtime value of the metadata satisfies the condition; and
    enabling the end user device to access the created child node.

9. The method of claim 8, wherein the instance of the ancestor node comprises one of an instance of a parent node for the instance of the child node and the instance of the ancestor node of the instance of the parent node for the instance of the child node.

10. The method of claim 8, wherein the method further comprises:
    determining whether the runtime value of the metadata satisfies an alternative condition;
    and creating an instance of an alternative child node in response to a determination that the runtime value of the metadata satisfies the alternative condition.

11. The method of claim 8, wherein the runtime value of the metadata associated with the instance of the ancestor node comprises a corresponding case role.

12. The method of claim 8, wherein the runtime value of the metadata associated with the instance of the ancestor node comprises a corresponding case phase.

13. The method of claim 8, wherein the metadata associated with the instance of the ancestor node comprises a corresponding set of access permissions, and wherein the corresponding set of permissions is created from a group comprising create permission, read permission, update permission, delete permission, and no access permission.

14. A computer program product, comprising a non-transitory computer-readable medium having a computer-readable program code embodied therein to be executed by one or more processors, the program code including instructions to:
    receive, from an end user device, a runtime request to create an instance of a child node in a case model;
    identify an instance of an ancestor node associated with the instance of the child node;
    identify a runtime value of metadata associated with the instance of the ancestor node and corresponding to the instance of the child node;

determine whether the runtime value of the metadata satisfies a condition;

create the instance of the child node in response to a determination that the runtime value of the metadata satisfies the condition; and enable the end user device to access the created child node.

15. The computer program product of claim 14, wherein the instance of the ancestor node comprises one of an instance of a parent node for the instance of the child node and the instance of the ancestor node of the instance of the parent node for the instance of the child node.

16. The computer program product of claim 14, wherein the program code includes further instructions to: determine whether the runtime value of the metadata satisfies an alternative condition; and create an instance of an alternative child node in response to a determination that the runtime value of the metadata satisfies the alternative condition.

17. The computer program product of claim 14, wherein the runtime value of the metadata associated with the instance of the ancestor node comprises a corresponding case role.

18. The computer program product of claim 14, wherein the runtime value of the metadata associated with the instance of the ancestor node comprises a corresponding case phase.

19. The computer program product of claim 14, wherein the runtime value of the metadata associated with the instance of the ancestor node comprises a corresponding set of access permissions.

20. The computer program product of claim 14, wherein the corresponding set of permissions is created from a group comprising create permission, read permission, update permission, delete permission, and no access permission.

* * * * *